A. W. MORSE.
VALVE.
APPLICATION FILED MAY 6, 1913.

1,111,399.

Patented Sept. 22, 1914.

Attest:
Clarence S. Campbell
Mary H. Lewis

Albert W. Morse, Inventor:
by William R. Baird
his Atty

UNITED STATES PATENT OFFICE.

ALBERT W. MORSE, OF NEW YORK, N. Y., ASSIGNOR TO NATHAN MANUFACTURING COMPANY, OF NEW YORK, N. Y., A CORPORATION OF NEW YORK.

VALVE.

1,111,399.  Specification of Letters Patent.  Patented Sept. 22, 1914.

Application filed May 6, 1913. Serial No. 765,735.

*To all whom it may concern:*

Be it known that I, ALBERT W. MORSE, a citizen of the United States, residing at New York, in the county of New York and State of New York, have invented certain new and useful Improvements in Valves, of which the following is a specification.

This invention relates to valves, and may be embodied in gate, eccentric, swivel, and other types of valves well known to the art.

For the purposes of this description there is shown a rocking valve, merely because the nature of the invention may be readily perceived from its application to such a valve.

Broadly, the object of the invention is to provide simple and substantial means whereby the efficiency of valves in service, and their service life, is increased, while at the same time the cost of maintenance is decreased. How these desirable results are accomplished will in some particulars be specifically pointed out hereinafter, and will be otherwise apparent from the following description of parts, relations, and operations incident to the invention.

Figure 1:
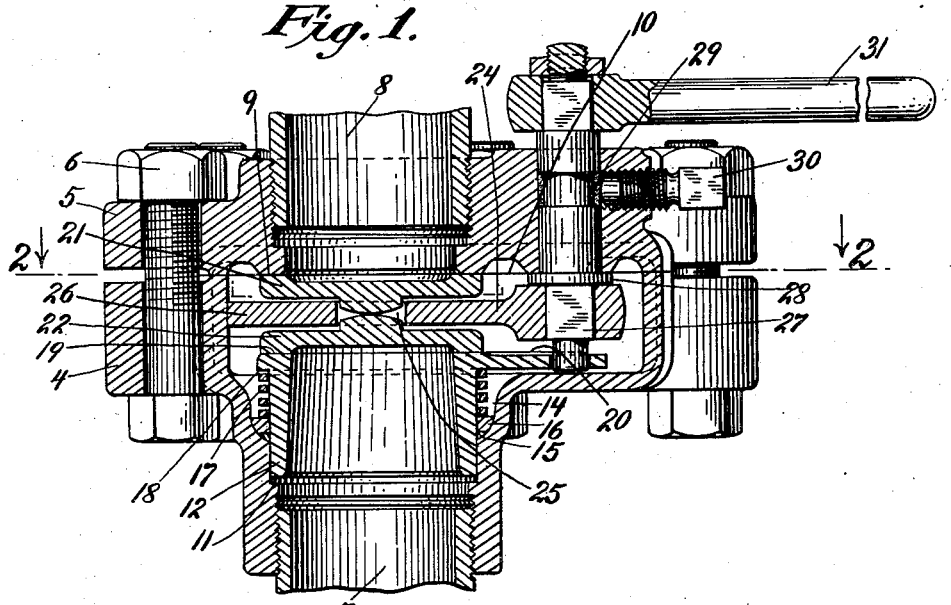
Figure 2:
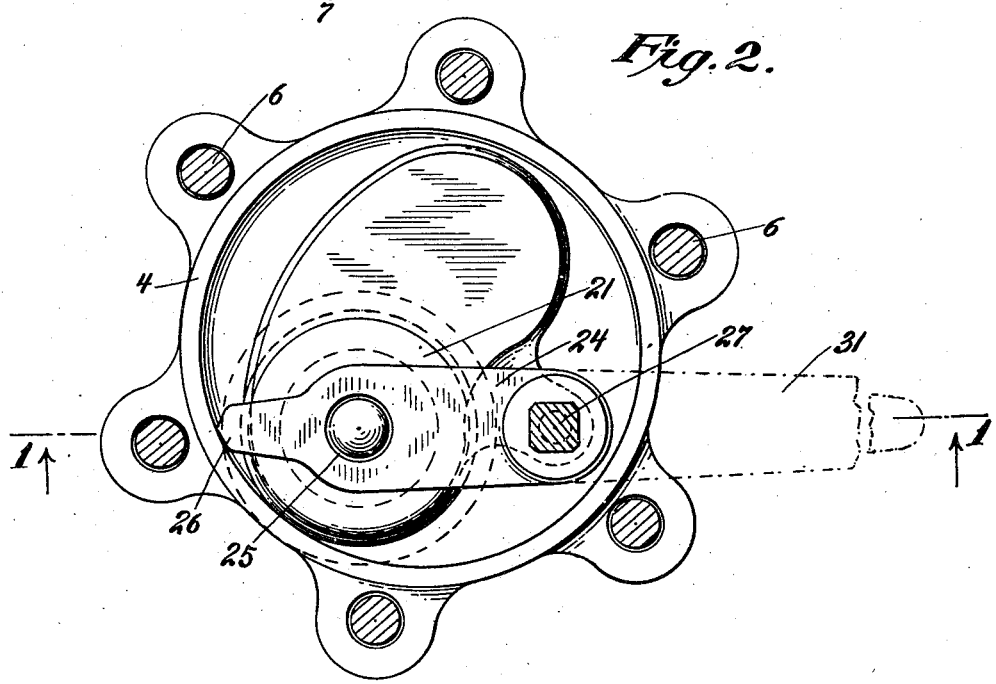

In the accompanying drawings, which form a part of this specification, Figure 1 is a vertical cross section through a valve of the rocking type; Fig. 2 is a horizontal section on the plane of the line 2—2 in Fig. 1, and a plan of the parts beneath the section plane.

There is shown in the drawings a valve casing preferably made in two complementary parts, 4 and 5, secured in proper relation by means of bolts 6. There are alined transverse ports 7 and 8 in the casing members 4 and 5, respectively, the port 7 being the inlet port and the port 8 the outlet port. At the inner end of the outlet port 8, the casing member 5 is formed with a valve seat 9, and with an extension having a surface 10 in the same plane as such valve seat. Near the inlet port 7 of the complementary casing member 4 there is provided a shoulder 11, against which one end of a tubular member, or sleeve, 12, is adapted to abut, said sleeve being slidable within the bore 14 of the casing member 4 inwardly from the shoulder 11. The sleeve 12 may be provided with packing rings 15, to make a tight joint between it and the bore 14. The bore 14 is somewhat enlarged at its inner end, to accommodate a packing 16 which is forced between the bore 14 and the sleeve 12 by means of a coiled spring 17 surrounding the sleeve 12, and bearing at one end against the packing 16 and at the other end against an outwardly extending annular flange 18 at the inner end of the sleeve 12. Preferably the bore of the sleeve 12 is everywhere of less diameter than that of the inlet port 7, including the annular shoulder 11, and the interior diameter of the sleeve 12 also preferably decreases toward its inner end, so that the tendency of the pressure of the fluid entering the port 7 will be to move the sleeve inwardly, assisting the expansible force of the spring 17. Furthermore, with this arrangement, the fluid entering the device together with such foreign matter as it may contain, is diverted toward the center of the sleeve and correspondingly through the outlet port 8 and away from the valve seat 9, thus protecting the latter against wear and undesirable accumulations of such foreign matter. The inner end of the sleeve 12 is formed into a valve seat 19, similar to the valve seat 9 in the casing member 5, and this sleeve 12 is also provided with a lateral extension having a surface 20 in the same plane as the valve seat 9.

The valve which coöperates with the valve seats 9 and 19 comprises two similar disks or parts 21 and 22, each of which has a face conforming to one of the valve seats. The valve made up of these two disks is moved into position between the valve seats 9 and 19 by suitable means such as an arm 24, which has an opening through it indicated at 25. Each valve disk 21 and 22 has a boss extending into this aperture 25, so that the bosses of the disks bear against each other while, at the same time, neither disk bears against the arm 24. The opposed faces of the bosses are preferably convex and arcuate, as shown, so that there is the least possible friction between them, and one may rotate relatively to the other. Furthermore, the two disks are, by this structure, rendered independently self-adjustable on their seats. The arm 24 has at one end an extension 26 which serves, by its engagement with the inner wall of the casing member 4, as a means for limiting the travel of the arm. The other end of the arm 24 has a squared opening, in which is engaged a squared part of a spindle 27, which passes not only through the arm 24 but also loosely through the lateral extension 20 of the sleeve 12.

At one side of the arm 24 the spindle has a collar 28, bearing against a surface of the casing member 5 in the plane of the valve seat 9. Preferably such opposed surfaces are accurately ground. The outer end of the spindle 27 projects from the casing member 5, and within the casing member 5 there is preferably provided a packing 29 about the spindle. A packing screw 30 enters the casing member 5 and engages the packing 29, whereby leakage about the spindle may be further minimized. At its outer end the spindle may be fitted with a lever 31 for turning it.

As the valve spindle is turned the arm 24 moves with it to bring the valve disks 21 and 22 into position to open or close the ports 7 and 8 to each other. When the disks are in the closed position, shown in Fig. 1, the movement of such disks in one direction is prevented by the engagement of the arm extension 26 with the wall of the casing member 4. As the spindle is operated to uncover the ports, the valve disks ride over the surfaces 10 and 20 which are in the planes, respectively, of the valve seats 9 and 19, whereby the seating faces of the disks are ground during all their movements. Furthermore, since the disks 21 and 22 are free to rotate with respect to each other, uniform grinding of their seating faces is assured. The sleeve 12 is held against material forward movement when the valve is open, inasmuch as said valve is then bearing against the extension 20 thereof.

The function of the valve 12 is important. When the valve disks are in position over their seats, as the sleeve 12 moves inwardly under spring pressure, or under combined spring pressure and fluid pressure, the movable seat 19 engages the disk 21 which, through the bosses on the two disks, transmits the pressure to the disk 22, which is thereby forced against the stationary seat 9. Such movable valve seat 19 therefore acts as an additional or protective seat to assist the primary or main seat located at the outlet side of the valve. Also, it forces the valve disks to their seats when the ports are open, or when little or no fluid pressure is available for this purpose. The wear of both valve disks and both valve seats is automatically taken up, "chattering" is prevented, as well as the lodging of foreign matter between the disks and seats, and the disks and seats are self grinding during the normal operations of opening and closing the ports. Since the disk 21 receives the pressure of the spring or of the fluid and transmits such pressure directly to the disk 22 and the seat 19 without affecting at all the arm 24, the arm 24 is, as a consequence, under no strain at all except that due to the normal operations of opening and closing.

What I claim is:

1. In a device of the character set forth, the combination with a casing having oppositely disposed inlet and outlet ports, of a valve seat for each port, one of said valve seats being movable toward and from the other, means for moving the movable seat toward the other seat, an arm movable to and from a position between the seats, and valve disks located on opposite sides of the arm and interlocked therewith, said disks having a bearing against each other loosely in the arm, being capable of relative rocking movement and of movement transversely of the arm and coacting respectively with the seats, the movable seat constituting means for properly seating both the disks.

2. In a device of the character set forth, the combination with a casing having oppositely disposed inlet and outlet ports, of a valve seat for each port, said seats having substantially parallel seating surfaces, one of said valve seats being movable toward and from the other, means for moving the movable seat toward said other seat, an arm movable toward and from a position between the seats, and valve disks located on opposite sides of the arm and interlocked therewith and bearing against each other, said disks being capable of relative rocking movement and of movement transversely of the arm and coacting respectively with the seats, the movable seat having a direct pressure against both disks and constituting means for properly seating both disks.

3. In a device of the character set forth, the combination with a casing having a port, of a valve seat slidably mounted in the port, means for urging the seat inwardly, said seat having an extension on one side, and a valve slidable on the seat and the extension to and from a position to close the port, said valve when the port is uncovered resting on the extension at one side of the seat and holding said seat against abnormal inward movement.

4. In a device of the kind described, a casing having alined inlet and outlet ports and a stationary valve seat surrounding the outlet port, a tubular member slidable in the inlet port and having a valve seat and an outwardly extending flange about its inner end, packing between said tubular member and the adjacent wall of the inlet port, a spring bearing between the flange and the packing and urging the tubular member to movement in an inward direction, and a valve part coöperative with the valve seat of the tubular member.

5. In a device of the kind described, a casing having alined inlet and outlet ports and a stationary valve seat surrounding the outlet port, a tubular member slidable in the inlet port and having a valve seat and an outwardly extending flange about its inner end, packing between said tubular member and the adjacent wall of the inlet port, a spring bearing between the flange and the packing and urging the tubular member to movement in an inward direction, a valve part coöperative with the valve seat of the tubular member, and a second valve part against which the first bears and which in turn bears against the stationary valve seat.

6. In a device of the kind described, a casing having alined inlet and outlet ports and a stationary valve seat surrounding the outlet port, a tubular member slidable in the inlet port and having a valve seat and an outwardly extending flange about its inner end, packing between said tubular member and the adjacent wall of the inlet port, a spring bearing between the flange and the packing urging the tubular member to movement in an inward direction, a valve part coöperative with the valve seat of the tubular member, and a second valve part against which the first bears and which in turn bears against the stationary valve seat, the two valve parts being opposed to each other and having portions with convex surfaces bearing on each other.

7. In a device of the kind described, a casing having alined inlet and outlet ports and a stationary valve seat surrounding the outlet port, a tubular member slidable in the inlet port and having a valve seat and an outwardly extending flange about its inner end, said flange having an extension on one side, packing between said tubular member and the adjacent wall of the inlet port, a spring bearing between the flange and the packing and urging the tubular member to movement in an inward direction, a valve part coöperative with the valve seat of the tubular member, and movable over the extension of the flange a second valve seat against which the first bears and which in turn bears against the stationary valve seat, the two valve parts being opposed to each other and having portions with convex surfaces bearing on each other, and an arm having portions between and spaced from the opposed faces of the two valve parts, and having another portion engaging the bearing portions thereof.

8. In a device of the kind described, a casing having alined inlet and outlet ports, a tubular member slidable in the casing and having a valve seat controlling the inlet port, the tubular member having a lateral extension with a surface in the plane of the valve seat, a valve part coöperative with the valve seat, an arm for actuating the valve part, and a spindle passing through and keyed to the arm having a bearing in the extension of the tubular member.

9. The combination with a valve casing having an inlet and an outlet, a tubular member slidably mounted on the inlet, a valve member operating against the tubular member, and operating means for the valve member having an engagement with the sleeve member.

10. In a device of the character set forth, the combination with spaced oppositely disposed valve seats that are relatively movable toward and from each other, of means for relatively urging the seats toward each other, oppositely disposed valve elements coacting respectively with the seats and bearing against each other, said valve elements being movable together to and from operative positions against the seats, and being relatively rotatable and capable of relative tilting movement, and means for moving the valve elements to and from their seated positions, said valve elements being also movable together under the direct pressure caused by the relative movement of the valve seats, to maintain them properly seated by such relative movement.

In testimony whereof I affix my signature in presence of two witnesses.

ALBERT W. MORSE.

Witnesses:
  CLARENCE G. CAMPBELL,
  MARY H. LEWIS.